No. 829,122.  
PATENTED AUG. 21, 1906.

J. A. NY & F. MEADOWS.  
COMBINED BATTERY AND BELL.  
APPLICATION FILED AUG. 23, 1905.

WITNESSES:  
Chas. F. Barrett  
M. A. Milord

INVENTORS  
Jules A. Ny and Fred K. Meadows  
by Frederick Benjamin  
ATTY

THE NORRIS PETERS CO., WASHINGTON, D. C.

UNITED STATES PATENT OFFICE.

JULES A. NY AND FREDERICK MEADOWS, OF OAKLAND, CALIFORNIA.

COMBINED BATTERY AND BELL.

No. 829,122.  Specification of Letters Patent.  Patented Aug. 21, 1906.

Application filed August 23, 1905. Serial No. 275,369.

*To all whom it may concern:*

Be it known that we, JULES A. NY and FREDERICK MEADOWS, citizens of the United States, residing at Oakland, in the county of Alameda and State of California, have invented certain new and useful Improvements in a Combined Battery and Bell, of which the following is a specification.

This invention relates to a combination electric battery and electromagnetic bell; and the especial object is to produce a device which will combine in compact and accessible form a dry battery and an electrically-operated bell, so that when it is desired to renew the battery or apply a new battery the operation can be readily performed in a simple manner and at very little expense.

Our invention consists, essentially, in combining with an ordinary electric magnetic bell a dry battery, the combination and connection being effected mechanically by a suitable inclosing box and electrically by suitable contacts. This device is intended to be operated through the ordinary push-button which effects the closing of the circuit.

Figure 1:
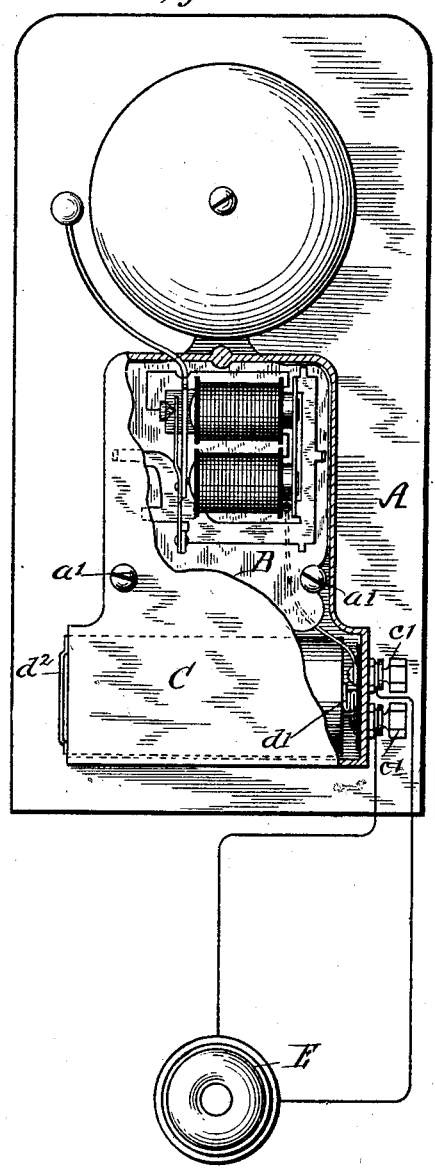
Figure 2:
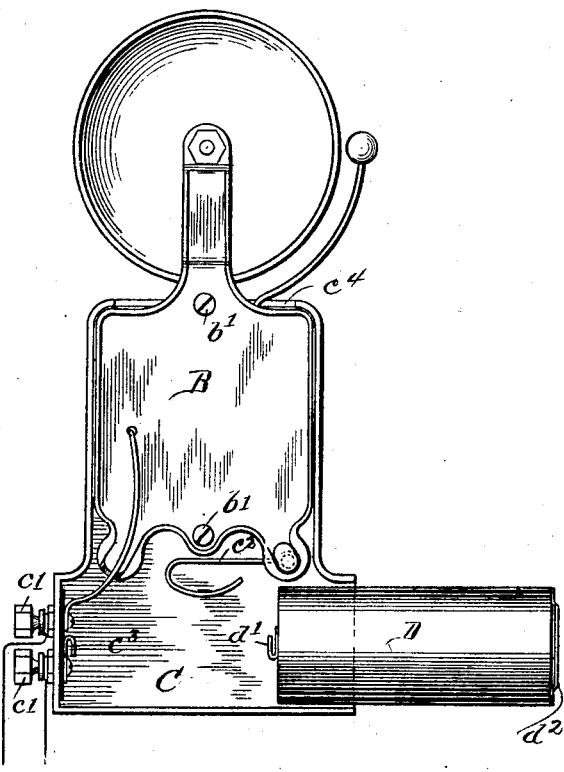

Referring to the accompanying drawings, which form a part of this application, Figure 1 is a front elevation of our invention with a portion broken away to more clearly illustrate its construction with the battery shown in operative position, and Fig. 2 is a rear elevation of the device with the battery in inoperative position.

Referring to the details of the drawings, A represents a board or base on which the device is mounted by screws $a'$.

B represents generally an electromagnetic bell and its operative mechanism, the same being of well-known form and not constituting *per se* a part of my invention.

C represents a metal box which is open on the rear side and at one end and is adapted to receive and cover the magnets of the bell and their adjacent parts and also is adapted to receive the cylindrical dry battery D of well-known form.

Attached at one end of the box C are binding-posts $c'$ $c'$, which are respectively connected in circuit with the positive and negative wires of the electromagnets. $c^2$ is a flat spring secured to the box C and having its free end extending downwardly into the path of the battery D when the latter is pushed into the box. One of the binding-posts $c'$ is electrically connected with the magnets, and the other binding-post has connected therewith a spring-contact $c^3$, the free end of which projects outwardly from the end wall of the box and at a point opposite the center of the longitudinal center of the battery D. When the battery is pushed into the box the full limit, the spring-contact $d'$, which is secured to the bottom of the battery and is connected with its electrode, presses against the contact $c^3$, and thus brings the battery in circuit with the magnet and bell, as will be readily understood.

To facilitate the withdrawal of a battery for the purpose of inserting a new battery, we attach to one end of the battery a loop $d^2$, which may be engaged by the fingers or by a tool, and thus withdrawn. The tension of the spring $c^2$ is sufficient to hold the battery in position against accidental displacement. If for any reason it be desired to disconnect the bell, it is only necessary to draw the battery away from the contact $c^3$. The upper portion of the box C is cut away in its end wall, as at $c^4$, to permit the passage of the portion of the magnet-holder that supports the bell. Otherwise the box incloses and protects the magnets and the adjacent parts, as well as the battery.

If access be desired to the magnets, it is only necessary to remove the screws $a'$ and the screws $b'$, thus disconnecting the device from the board A and the magnets supporting-plate from the box, whereby the magnets will be exposed.

Having thus described our invention, what we claim as new, and desire to obtain by Letters Patent, is—

1. In combination, an electromagnetic bell device, a box secured to said device and having binding-posts thereon, said posts being connected in circuit with the magnets of said device, a contact connected with one of said posts, a battery slidably and removably arranged in said box and having a contact adapted to engage the contact on said post when the battery is in place, means holding said battery against accidental displacement and forming a terminal for said circuit, and manually-operated means for making and breaking the circuit.

2. In combination, an electromagnetic bell device, a box secured to said device and having binding-posts thereon, said posts being connected in circuit with the magnets of said device, a contact connected with one of said posts, a battery slidably arranged within said box and having a contact on its inner end adapted to engage the binding-post contact when the battery is in place, a spring engaging said battery, holding it against accidental displacement and forming a terminal for said circuit, and manually-operated means for making and breaking the circuit.

In testimony whereof we affix our signatures in presence of two witnesses.

JULES A. NY.
FREDERICK MEADOWS.

Witnesses:
HENRY P. TRICOU,
P. J. EISENMANN.